United States Patent Office 2,727,870
Patented Dec. 20, 1955

2,727,870

MODIFIED ALKYD RESINS

Ellington M. Beavers and Richard S. Urban, Philadelphia, Pa., assignors to Rohm & Haas Company, Philadelphia, Pa., a corporation of Delaware No Drawing. Application March 4, 1953,
Serial No. 340,386

4 Claims. (Cl. 260—22)

This invention relates to alkyd resins which are modified by reaction with both styrene and methyl methacrylate. It relates to resinous products which, as a result of their composition, have an unusual combination of properties and are eminently useful as vehicles for metal-decorating finishes.

The products of this invention are prepared by reacting both styrene and methyl methacrylate in certain ratios with a particular kind of pre-formed alkyd resin. The reaction is carried out in solution and in the presence of a polymerization catalyst, preferably an organic peroxidic catalyst. During the reaction the styrene and methyl methacrylate copolymerize and also combine with the alkyd resin so that the resultant product is a homogeneous solution of a resin which, when deposited on a surface, dries to a clear, hard film characterized by toughness and resistance to aliphatic hydrocarbons such as gasoline.

Resinous products have been made heretofore by the reaction of styrene with alkyd resins and with the components of alkyd resins. Such materials are disclosed for example in United States Patents 1,975,959, 2,495,458, 2,470,757, 2,470,752, 2,549,767, 2,457,768 and 2,392,710. While such products are used commercially in the preparation of surface coatings, it is firmly believed that the products of this invention represent a real and valuable improvement over the older materials, especially in the formulation of metal decorating enamels.

The alkyd resins which are reacted by the process of this invention with styrene and methyl methacrylate are made from (a) phthalic anhydride, (b) one or more polyhydric alcohols containing three to six hydroxyl groups such as glycerol, pentaerythritol, mannitol and sorbitol, and (c) dehydrated castor oil and/or the fatty acids of dehydrated castor oil. The alkyd resins employed are, furthermore, those which are known as "long oil alkyds" inasmuch as they contain a relatively high ratio (approximately three to two) of esterified fatty acid to esterified phthalic anhydride. Thus the alkyds which are employed are those made from a mixture of the three kinds of reactants described above, in which mixture phthalic anhydride constitutes 22–26% of the total weight. Furthermore, the alkyd resins have an acid number less than 25 and preferably less than 20.

While it is preferred that approximately the same weight of styrene and methyl methacrylate be reacted with the alkyd resin, ratios of styrene-to-methyl methacrylate from 1:3 to 3:1 can be employed satisfactorily provided that the combined weight of the styrene and methyl methacrylate is 35–45% of the total weight of the two monomeric materials and the alkyd resin.

The three reactants are dissolved in an inert organic solvent together with a polymerization catalyst and the solution is heated at a temperature above 100° C.—and preferably from about 100° C. to about 140° C.—until the polymerization and chemical combination is essentially complete. The end-point is easily determined by a measurement of the viscosity of the solution and it has been found that products having a viscosity of about 10 to 20 poises when measured at 25° C. as 50% solutions in xylol are particularly satisfactory. A most convenient way to carry out the reaction is to hold the reaction mixture at refluxing temperature.

Toluol and xylol are very good solvents for the reaction mixture as well as mixtures of these and/or other aromatic hydrocarbons such as are present, for example, in Solvesso 150 and Amsco F–80.

A rather large proportion of the polymerization catalyst is employed; and it has been found desirable to add some of the catalyst during the course of the reaction in addition to that employed at the start in order to overcome a tendency of the reaction to slow down. About 3–10% catalyst—and preferably 4–8%—based on the total weight of the styrene and methyl methacrylate is employed. The following are typical of suitable catalysts: acetyl peroxide, lauroyl peroxide, succinyl peroxide, tert.-butyl hydroperoxide, di-tert.-butyl peroxide, cumene hydroperoxide, caprylyl peroxide, azoisobutyronitrile, and methyl azoisobutyrate.

The following example in which all parts are by weight serves to illustrate the process for making the products of this invention.

*Example*

Part A.—A 3-necked reactor equipped with thermometer, mechanical stirrer and reflux condenser was thoroughly flushed with nitrogen and into the reactor was poured 484 parts of dehydrated castor oil. Stirring and heating were begun and 50.2 parts of glycerol and 55.5 parts of pentaerythritol were added. When the temperature reached 125° C., 0.1 part of sodium methoxide was added. Heating was continued until the temperature reached 255° C. (about 4½ hours total), after which the reaction mixture was held at 255–260° C. for two hours. The mixture was cooled to 160° C. and 181.3 parts of phthalic anhydride added. Then the temperature was raised to 230–235° C. and held there until the mixture had increased to a viscosity of 8.8 poises (V on the Gardner-Holdt scale) when measured as a 75% solution in xylol. The temperature was lowered to 220° C. after which it was maintained at 220°–225° C. for a period of 5 hours during which time the viscosity of the resin increased to 13 poises (X on the Gardner-Holdt scale) and the acid number fell to 12. The reaction mixture was cooled to 125° C. and at this point 250 parts of xylol was added. The finished product, a clear, pale solution of resin, had a viscosity of 2 poises (H on the Gardner-Holdt scale) at 25° C. and a resinous solids-content of approximately 75%.

Part B.—Into a three-necked reactor equipped with thermometer, mechanical stirrer and reflux condenser was charged the following mixture:

400 parts of the resin solution prepared in part A above
395 parts of xylol
99 parts of styrene
99 parts of methyl methacrylate
9.9 parts of cumene hydroperoxide.

The mixture, blanketed with nitrogen, was stirred and rapidly heated to 130° C. Stirring was continued throughout and the mixture was held at 128–132° C. for seven hours. The product, a clear solution, had a viscosity of 5 poises at 25° C. (S on the Gardner-Holdt scale) and a solids-content of 48.5%.

In the same way other resins were prepared having different ratios of reactants within the limits set forth above. All of the products of this invention are eminently suited as vehicles for metal-decorative enamels because they provide films which not only dry rapidly but are hard, tough, chemical-resistant and which retain their adhesion and luster when the coated metal is bent or drawn or is otherwise fabricated. In this respect they have a real advantage over the so-called "styrenated alkyds."

We claim:
1. A process for preparing modified alkyd resins which comprises heating and polymerizing, in solution at a temperature above about 100° C. and in the presence of a polymerization catalyst, a mixture of styrene, methyl methacrylate and a pre-formed alkyd resin, the styrene and methyl methacrylate being present in a ratio to each other of 3:1 to 1:3 and in a combined amount equal to 35 to 45% of the total weight of said mixture, and said alkyd resin having an acid number less than 25 and being the product of reacting (a) phthalic anhydride, (b) a polyhydric alcohol containing 3 to 6 hydroxyl groups, and (c) a member of the class consisting of dehydrated castor oil and the fatty acids of dehydrated castor oil, the amount of phthalic anhydride being 22–26% of the total weight of the materials (a), (b) and (c).

2. A process for preparing modified alkyd resins which comprises heating and polymerizing, in solution at a temperature from about 100° C. to about 140° C. and in the presence of an organic peroxidic polymerization catalyst, a mixture of styrene, methyl methacrylate and a pre-formed alkyd resin, the styrene and methyl methacrylate being present in approximately equal amounts and in a combined amount equal to 35 to 45% of the total weight of said mixture, and said alkyd resin having an acid number less than 20 and being the product of reacting phthalic anhydride, glycerol and dehydrated castor oil, the amount of phthalic anhydride being 22–26% of the total weight of said phthalic anhydride, glycerol and dehydrated castor oil.

3. A resinous material which is particularly adapted as a vehicle for metal-decorating finishes consisting of the product obtained by heating and polymerizing, in solution at a temperature above about 100° C. and in the presence of a polymerization catalyst, a mixture of styrene, methyl methacrylate and a pre-formed alkyd resin, the styrene and methyl methacrylate being present in a ratio to each other of 3:1 to 1:3 and in a combined amount equal to 35 to 45% of the total weight of said mixture, and said alkyd resin having an acid number less than 25 and being the product of reacting (a) phthalic anhydride, (b) a polyhydric alcohol containing 3 to 6 hydroxyl groups, and (c) a member of the class consisting of dehydrated castor oil and the fatty acids of dehydrated castor oil, the amount of phthalic anhydride being 22–26% of the total weight of the materials (a), (b) and (c).

4. A resinous material which is particularly adapted as a vehicle for metal-decorating finishes consisting of the product obtained by heating and polymerizing, in solution at a temperature from about 100° C. to about 140° C. and in the presence of an organic peroxidic polymerization catalyst, a mixture of styrene, methyl methacrylate and a pre-formed alkyd resin, the styrene and methyl methacrylate being present in approximately equal amounts and in a combined amount equal to 35 to 45% of the total weight of said mixture, and said alkyd resin having an acid number less than 20 and being the product of reacting phthalic anhydride, glycerol and dehydrated castor oil, the amount of phthalic anhydride being 22–26% of the total weight of said phthalic anhydride, glycerol and dehydrated castor oil.

References Cited in the file of this patent
UNITED STATES PATENTS

| | | |
|---|---|---|
| 2,580,289 | Fantl | Dec. 25, 1951 |

FOREIGN PATENTS

| | | |
|---|---|---|
| 609,749 | Great Britain | Oct. 6, 1948 |